United States Patent
Karni

[11] Patent Number: 5,245,986
[45] Date of Patent: Sep. 21, 1993

[54] SOLAR RECEIVER

[75] Inventor: Jacob Karni, Rehovot, Israel

[73] Assignee: Yeda Research and Development Company Limited, Rehovot, Israel

[21] Appl. No.: 820,418

[22] Filed: Jan. 14, 1992

[30] Foreign Application Priority Data

Jan. 14, 1991 [IL] Israel .................................. 97091

[51] Int. Cl.$^5$ ............................................. F24J 2/02
[52] U.S. Cl. ...................................... 126/680; 126/674; 126/648
[58] Field of Search ............... 126/438, 451, 439, 900, 126/901, 422, 680, 674, 684, 696, 648, 652

[56] References Cited

U.S. PATENT DOCUMENTS

| | | | |
|---|---|---|---|
| 4,105,014 | 8/1978 | Schwerzel | 126/900 |
| 4,117,829 | 10/1978 | Gross et al. | 126/449 |
| 4,121,564 | 10/1978 | Schwartz | 126/438 |
| 4,367,727 | 1/1983 | Llorach | 126/449 |
| 4,394,869 | 7/1983 | Drost | 126/438 |
| 4,421,097 | 12/1983 | Meckler | 126/422 |

FOREIGN PATENT DOCUMENTS

| | | | |
|---|---|---|---|
| 2436947 | 4/1980 | France . | |
| 2482269 | 11/1981 | France . | |
| 57-16955 | 10/1982 | Japan . | |
| 238944 | 10/1987 | Japan | 126/449 |
| 669837 | 4/1989 | Switzerland . | |

Primary Examiner—James C. Yeung
Attorney, Agent, or Firm—Helfgott & Karas

[57] ABSTRACT

A central solar receiver with a volumetric solar absorber. The volumetric absorber comprises an array of absorber members mounted on a base body and facing a window that admits concentrated solar radiation. Working fluid is injected into the volumetric absorber so as to flow in directions which intersect the absorber members.

20 Claims, 11 Drawing Sheets

SOLAR RECEIVER

GLOSSARY

Some of the terms that will be used in the following description and claims have the following meaning:

Solar absorber—a body or construct capable of absorbing and converting into heat impinging solar radiation.

Working fluid—a fluid flowing in contact with a solar absorber and taking up heat therefrom by indirect or direct heat exchange. The working fluid may serve as heat carrier for removal of the heat generated in the solar absorber. In addition or alternatively it may consist of a mixture of two or more components which, upon contact with the hot solar absorber, are induced to react with each other, i.e. to perform a so-called thermochemical process.

Central solar receiver—a device comprising a solar absorber and means for the circulation of a working fluid in indirect or direct heat exchange relationship therewith; so called because in operation it is mounted in the center, i.e. the focal region of a solar radiation concentrator.

Volumetric solar absorber—a solar absorber fabricated in form of a three-dimensional matrix enabling the throughflow of a working fluid in direct heat exchange relationship therewith.

FIELD AND BACKGROUND OF THE INVENTION

The invention relates to central solar receivers with volumetric solar absorber.

A central solar receiver absorbs concentrated sunlight at a high temperature, commonly about 700°-1500° C. and transfers the heat generated by the solar absorber therein to a working fluid which either serves as heat carrier fluid or else is designed to perform a thermochemical process. In one known kind of central solar receiver, a so-called tubular receiver, the working fluid flows inside tubes located usually near the inner periphery of the solar receiver housing. In such receiver, solar radiation is absorbed at the outer surface of the said tubes and is transmitted as heat to the working fluid therein which is thus heated up. The overall resistance to heat transfer and the ensuing heat loss in such tubular central solar receivers is relatively high.

In view of this deficiency of the tubular central solar receivers it has already been proposed to design central solar receivers with volumetric solar absorbers and the feasibility of this concept was demonstrated, inter alia, in three separate papers by H. W. Fricker et al., R. Buck and W. Pritzkow in "Solar Thermal Technology-Research Development and Application", Proceedings of the Fourth International Symposium, Sante Fe, NM, USA, June 1988, Hemisphere Publishing Corp., New York, pages 265-277, 279-286 and 635-643 respectively. These studies show that with a volumetric solar absorber-type central solar receiver it is possible to handle solar fluxes about 5-10 times larger than with existing tubular receivers and that in consequence the receiver size and weight can be reduced. It was also shown that in volumetric solar absorbers the temperature difference between the absorber and the working fluid is relatively small which enables the lowering of the average absorber temperature whereby radiation losses are reduced and material constraints are somewhat relieved. Furthermore, it was shown that the start-up time and system response to sunlight fluctuations are relatively fast whereby the efficiency of the system is increased.

Known volumetric solar absorbers are constructs in the form of foam, honeycomb or wire mesh matrices and they are made of materials capable of withstanding high temperatures, e.g. ceramics or special metal alloys such as, for example, stainless steel, and the flow of the working fluid in such known receivers is essentially either codirectional with or counter-directional to the incident solar radiation.

Investigations conducted in accordance with the present invention revealed that central solar receivers with prior art volumetric solar absorbers have a number of deficiencies which may be summed up as follows:

(1) Sunlight cannot penetrate deep into the absorbers and most of the radiation is absorbed at or near the front surface thereof.

(2) The transfer of energy between elements of the absorber matrix by conduction and reradiation is very limited. Accordingly, the matrix cannot redistribute the energy it absorbs and is incapable of adjusting to the normally very non-uniform incoming radiation it receives from the concentrators. Consequently, large temperature gradients and high local temperatures develop over the matrix.

(3) The working fluid flow cannot be adjusted prior to or during operation in a manner which would match the incoming radiation flux and even out the absorber temperature distribution.

(4) In cases where the absorber surface acts as catalyst for a heat induced reaction in a gas mixture, the contact time between the gas and the surface in the region exposed to direct sunlight is relatively short. Therefore, some of the reaction occurs under less favourable conditions, producing an overall lower yield.

(5) Temperature measurements over and within the absorber bed are difficult to perform.

(6) Damages to the absorber such as surface oxidation, rupture in case of wire mesh absorber construct and cracking in case of a foam or honeycomb type absorber construct, occur within several days of operation.

(7) The reradiation energy losses are higher than expected due to the existence of local temperature peaks which may exceed the average absorber temperature by several hundred degrees.

It is the object of the present invention to provide an improved volumetric solar absorber for a central solar receiver.

SUMMARY OF THE INVENTION

In accordance with the invention there is provided a central solar receiver comprising a housing with a window portion for the admission of incident concentrated solar radiation, a volumetric solar absorber within the housing made of material capable of withstanding high temperature, working fluid injector means and means for the withdrawal of hot working fluid, characterized in that the volumetric solar absorber comprises a base body holding an array of absorber members spaced from each other, projecting from one face thereof and having free ends turned towards said window portion of the housing, and in that said working fluid injector means are designed to inject the working fluid into the volumetric solar absorber in flow directions which intersect the absorber members.

Preferably said working fluid injector means are associated with the volumetric solar absorber and may, if desired, be mounted on the base body thereof. Also if desired, there may be a plurality of working fluid injector means which may be evenly distributed throughout the volumetric solar absorber or around the periphery thereof.

The invention further provides for use in a central solar receiver of the kind specified, a volumetric solar absorber unit comprising a base body holding an array of absorber members spaced from each other projecting from one face thereof. Preferably, the volumetric solar absorber is associated with one or more working fluid injector means which may, if desired, be mounted on the base body.

Where the working fluid injection means are mounted on the base body they may be tubular with any suitable profile and having a perforated section or a plurality of lateral ports or nozzles. The base side of such tubular injector is designed for connection to working fluid delivery means and the distal end portion is preferably sealed so as to ensure exclusively lateral ejection of the working fluid. Depending on the size of the volumetric solar absorber and other design parameters, the volumetric solar absorber may be fitted with one or more such injectors. Where there is only one injector it is preferably located in the region of maximum incoming radiation, which is usually in the centre of the absorber. In case of a plurality of injectors they will be distributed between the absorber members or around the periphery in regions corresponding to high incoming radiation fluxes.

The base body and absorber members of the volumetric solar absorber according to the invention are made of a material capable of withstanding the high temperature prevailing in a central solar absorber, e.g. ceramic materials, ceramic-coated metal alloys, silicon carbide, alumina, special types of stainless steel, nickel alloys, etc. The absorber members may also be coated with material capable of catalyzing a heat induced chemical reaction between components of the working fluid.

In a volumetric solar absorber according to the invention the absorber members are essentially elongated and they have the outer form of spikes or fins, each member projecting essentially normally from the base body portion to which it is attached; they may be massive or hollow and have any suitable profile such as cylindrical, conical or prismatic or also be in the form of flat panels. The use of hollow absorber members has the advantage that the heat generated by the absorbed solar radiation is concentrated in the relatively thin wall which provides for relatively high efficiency of heat transfer to the working fluid, and also reduces thermal gradients which produce mechanical stresses.

Depending on the design of the central solar receiver, the surface of the base body of the volumetric solar absorber from which the absorber members project may be flat, concave or convex.

In operation of a central solar receiver according to the invention, the working fluid is ejected laterally from the said injector means and the ejected working fluid flows in directions which intersect the absorber members and also the incident solar radiation, flowing between the absorber members and engulfing them whereby heat is withdrawn by the working fluid over the entire length of each absorber member. In its flow the working fluid also sweeps the base body. Accordingly, insofar that the base body is also heated, either directly by incident solar radiation or else in consequence of reradiation from the absorber members, heat from the base body is also given off to the working fluid.

In a volumetric solar absorber according to the invention, energy is readily transferred between absorber members by reradiation. Therefore, as distinct from prior art volumetric solar absorbers, absorbed energy is redistributed and the absorber is capable of adjusting to the non-uniformity of the incoming concentrated solar radiation and maintain throughout a relatively even horizontal temperature distribution.

Moreover, in a central solar receiver according to the invention the incident concentrated solar radiation penetrates into the depth of the volumetric absorber producing a relatively uniform vertical temperature distribution. Such vertical uniformity together with the above mentioned horizontal uniformity lead to a relatively uniform temperature field over the entire absorber, whereby the absorption and heat generating capacity of a volumetric solar absorber according to the invention is increased as compared to prior art volumetric solar absorbers of similar dimension. Furthermore, the flow regimen of the working fluid stipulated in accordance with the present invention also increases the heat transfer efficiency from the absorber to the working fluid. The overall result of all this is that the performance of a central solar receiver fitted with a volumetric solar absorber according to the invention is more efficient and effective than in accordance with the prior art.

DESCRIPTION OF THE DRAWINGS

For better understanding, the invention will now be described, by way of example only, with reference to the annexed drawings in which.

DESCRIPTION OF SPECIFIC EMBODIMENTS

Figure 1:
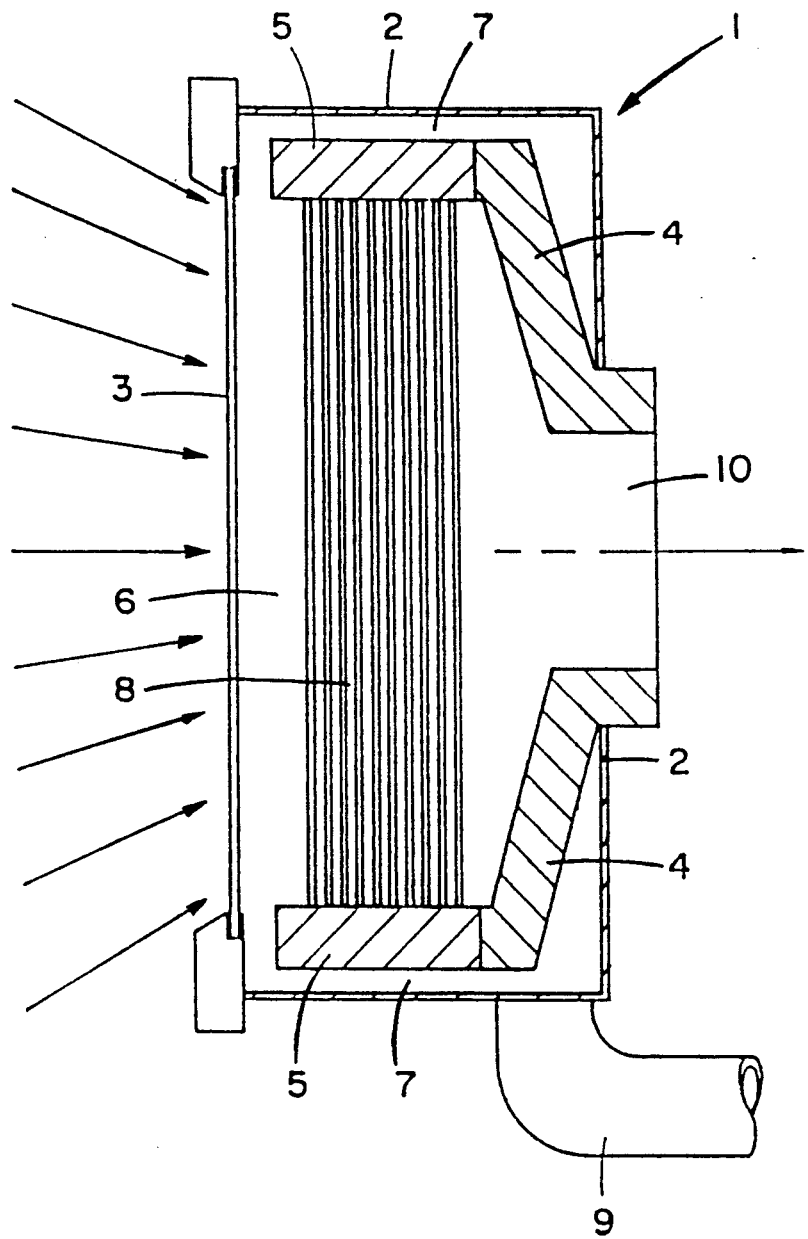
FIG. 1 is a schematic elevational section of a prior art central solar receiver with volumetric solar absorber.

FIG. 1 shows a typical prior art central solar receiver with a volumetric solar absorber. As shown, the receiver 1 has a housing 2 fitted with a quartz glass window 3 capable of admitting concentrated solar radiation and withstanding the high temperature thereof. A backwall 4 merging into a frame 5 divides the inner space of housing 2 into a central part 6 and a peripheral part 7. Frame 5 holds a volumetric solar absorber 8 consisting of a plurality of parallel steel wire nets. Casing 1 further comprises an intake tube 9 serving for the ingress of a working fluid, e.g. ambient air, and an opening 10 for the egress of heated-up working fluid. Intake tube 9 and opening 10 are connectable to suitable ducting means.

Figure 2B:
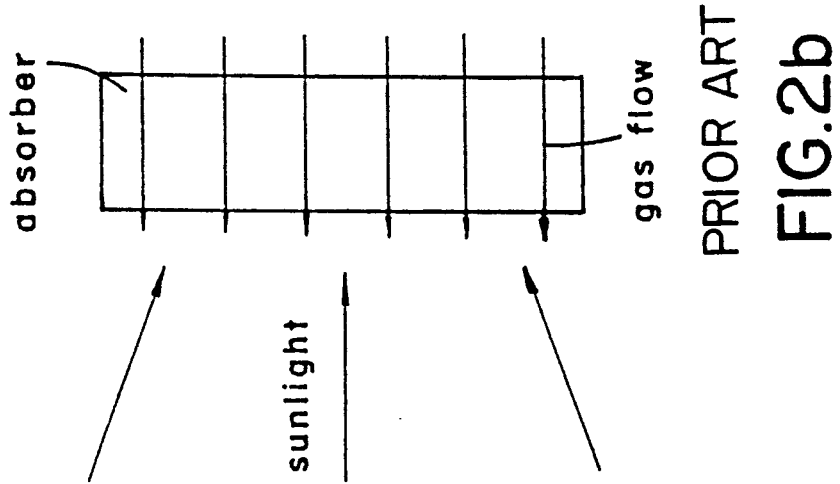
FIG. 2 shows schematically two flow regimens of working fluid in prior art volumetric solar absorbers.
Figure 2A:
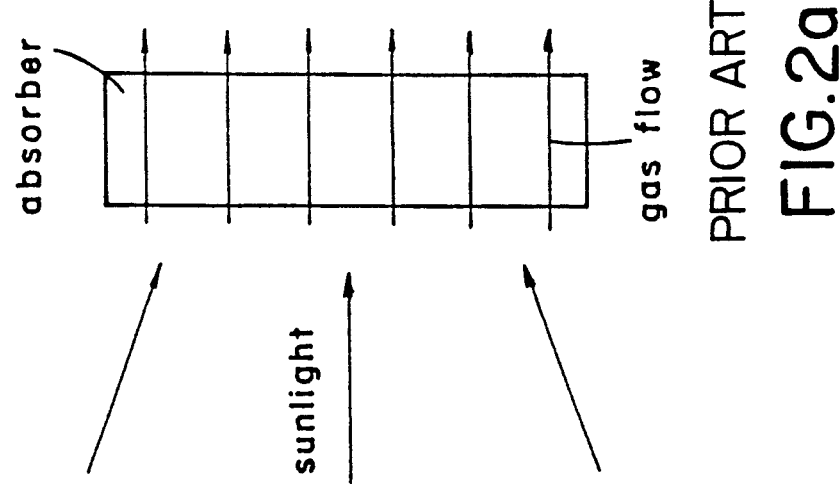

The working fluid ingressing via intake tube 9 flows through the peripheral part 7 of housing 2 and is diverted by the window 3 so as to flow across the volumetric solar absorber 8 essentially co-directionally with the incident concentrated solar radiation, and the regimen of such flow is shown in FIG. 2(a).

There are also known prior art central solar receivers with volumetric solar absorbers in which the flow direction of the working fluid across the volumetric solar absorber is essentially opposite to the direction of the incident solar radiation and such a flow regimen is shown in FIG. 2(b).

Figure 3:
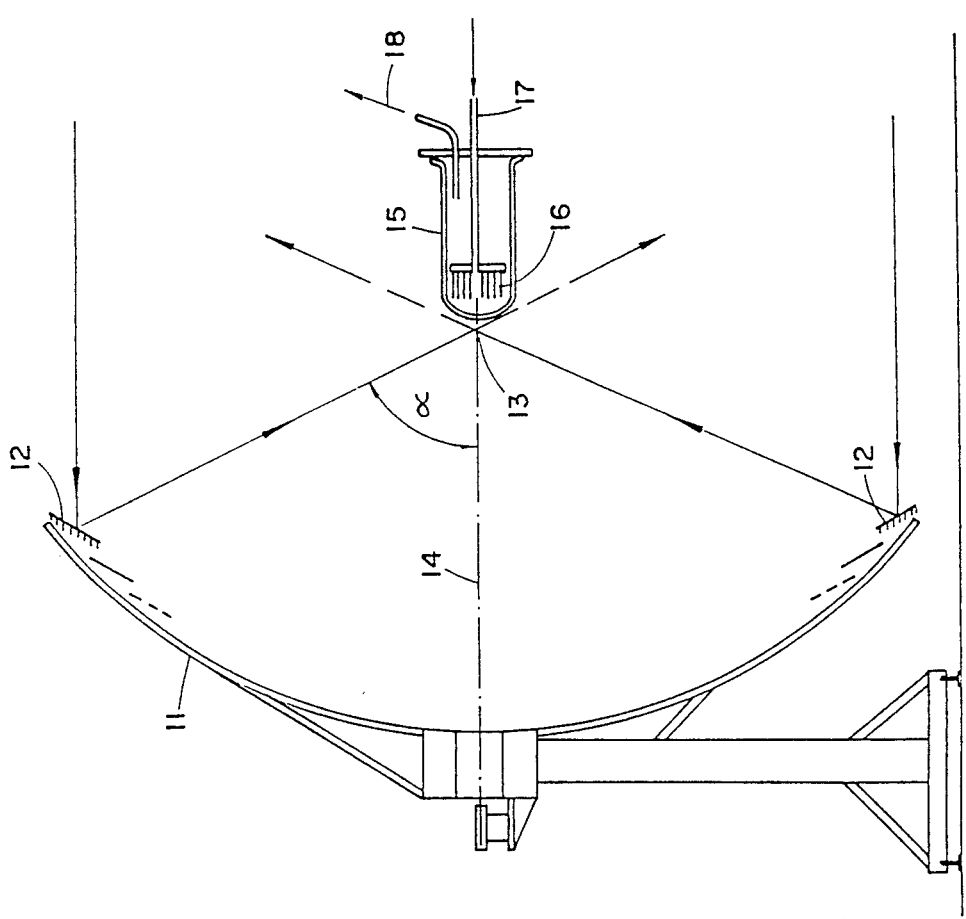
FIG. 3 is a schematic elevation of a solar furnace embodying a central solar receiver according to the invention.

Attention is now directed to FIG. 3 which is a schematic illustration of a solar furnace embodying a central solar receiver according to the invention.

As shown, a concentrator 11 fitted with a plurality of mirrors 12 is designed to concentrate incident solar radiation into a focal region 13 located on the central axis 14, the outer limit of the reflected concentrated solar radiation forming with axis 14 an angle α of approximately 60°.

Close to the focal region 13 is located a central solar receiver 15 fitted with a volumetric solar absorber 16 according to the invention. Ambient temperature working fluid is introduced into receiver 15 at 17 and injected into the volumetric solar absorber 16, and hot working fluid is withdrawn at 18.

Figure 4:
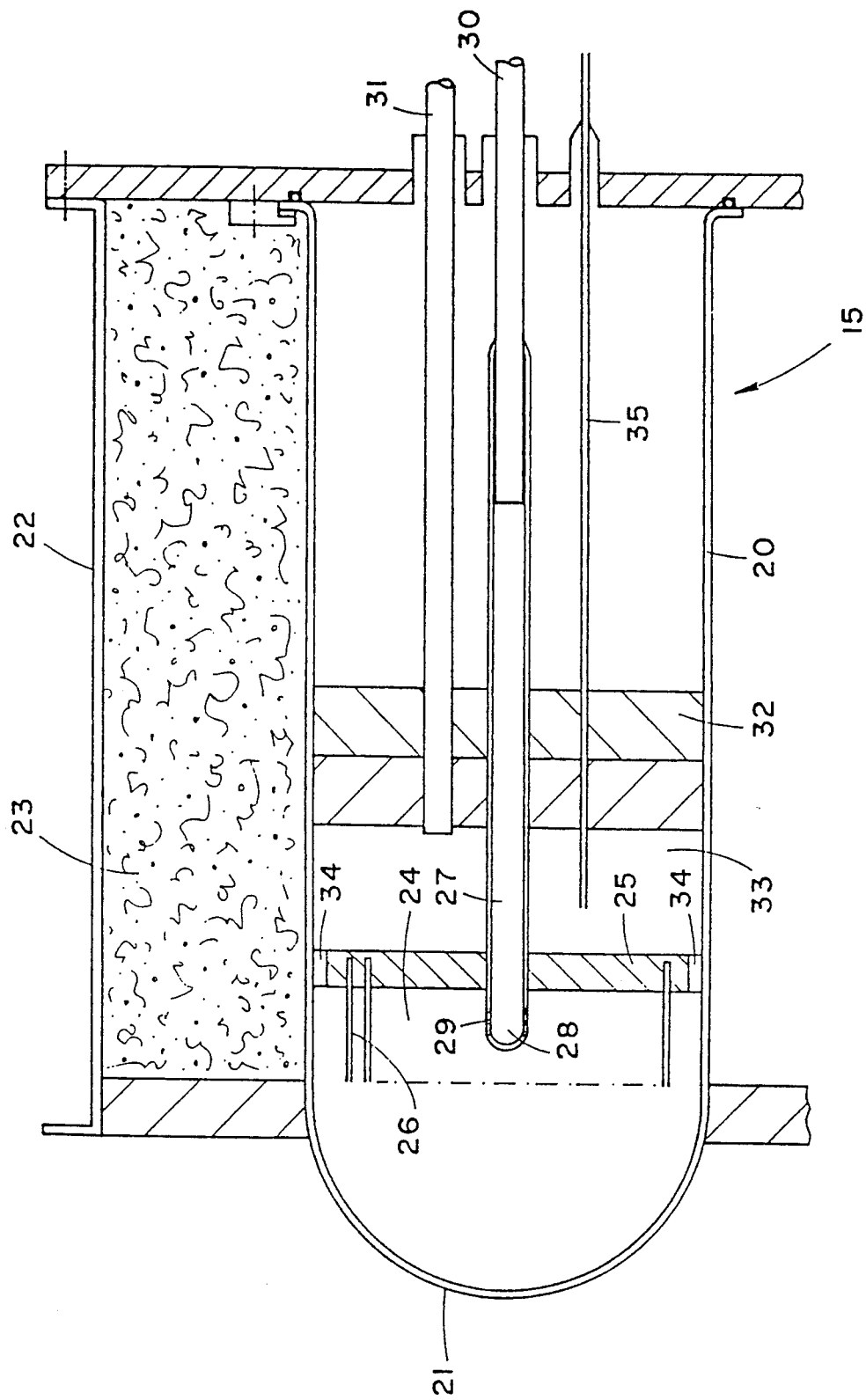
FIG. 4 is an axial section across the central solar receiver of the furnace in FIG. 3, drawn to a larger scale.

The design of the central receiver 15 in the furnace of FIG. 3 is more closely shown in FIG. 4. As shown, the central receiver comprises a cup-shaped quartz housing 20 having a dome-shaped terminal portion 21 serving as window for the admission of concentrated solar radiation. Housing 20 is mounted within a mantle 22 stuffed with insulating material 23 and mounted on supporting means (not shown). Mounted inside body 20 is a volumetric solar absorber 24 comprising a base body 25 holding a plurality of tubular absorber members 26 which project from the front side facing window 21. Both the base and the absorber members are made of suitable heat resisting material.

Base body 25 also holds an injector tube 27 having a head portion 28 with a plurality of lateral nozzles 29 by which working fluid is ejected into the volumetric solar absorber 24 so as to intersect the absorber members 26 essentially perpendicularly, also intersecting the incident solar radiation and sweeping the front face of base body 25. Injector tube 27 is coupled to a pipe 30 for the inflow of the working fluid. A second pipe 31 serves for the delivery of hot working fluid.

To the rear of the volumetric solar absorber 24 there is provided a partition 32 consisting of two juxtaposed plates and serving, among others, for holding the injector tube 27 and the delivery tube 31. Between partition 32 and base body 25 of the volumetric solar absorber 24 there is formed a chamber 33 communicating with the front side of base plate 25 through passages 34.

A sheath 35 accommodates a plurality of electric wires leading to thermocouples provided at various locations of the volumetric solar absorber 24 and serving for temperature measurements.

In operation ambient temperature working fluid ingresses via pipe 30 and is injected into the volumetric solar absorber 24 via nozzles 29. The injected working fluid engulfs all the tubular absorber members 26 and sweeps the front face of base body 25 and hot working fluid flows into chamber 33 via passages 34 and is delivered via pipe 31.

Figure 5:
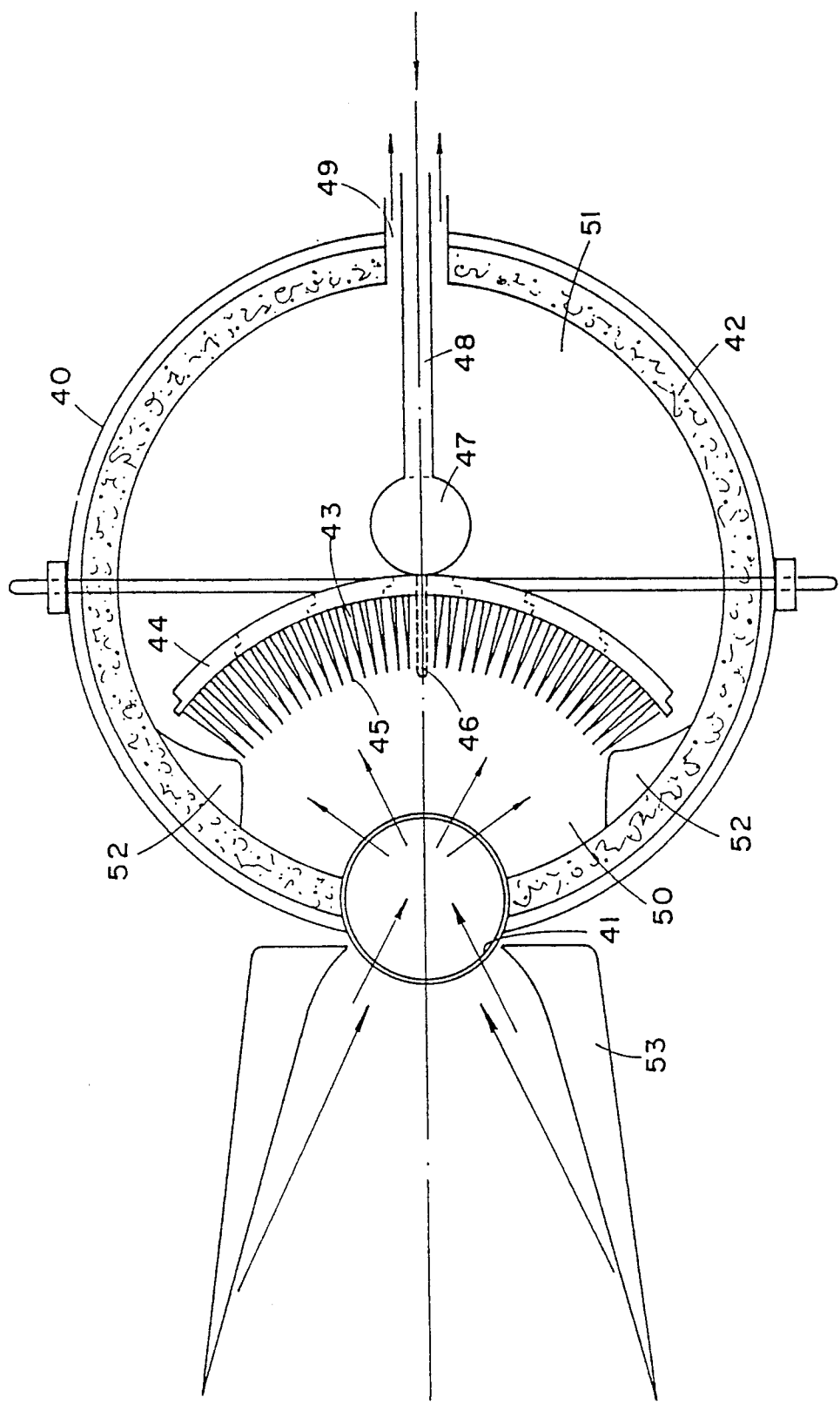
FIG. 5 is a schematic end view of another embodiment of a central solar receiver according to the invention.

FIG. 5 illustrates diagrammatically another embodiment of a central solar receiver according to the invention.

As shown, a cylindrical housing 40 e.g. of stainless steel, fitted with an insulation layer 42 and with a cylindrical quartz window 41 for the admission of concentrated solar radiation, accommodates a volumetric solar absorber 43 comprising a concave base body 44 holding a plurality of conical solar absorber members 45 projecting from the front side thereof so as to face window 41. In the centre of base body 44 there is mounted an injector member 46 having a sealed end portion and a plurality of lateral nozzles (not shown) and connecting at the rear to a pressure equalizing container 47 merging into a pipe 48 for the ingress of working fluid. Pipe 48 is mounted concentrically within a tubular opening 49 for the egress of hot working fluid and connecting to suitable delivery ducting means (not shown).

The volumetric solar absorber 43 divides the casing 40 into a front chamber 50 and a rear chamber 51, there being provided baffles 52 for diverting hot working fluid emerging from the volumetric solar absorber 43 from the front chamber 50 to rear chamber 51 from where it is discharged via the tubular opening 49.

Window 41 is associated with a concentrating reflector 53 which is a so-called secondary concentrator that further concentrates solar radiation that is already preconcentrated by a main concentrator (not shown).

In operation the working fluid arriving at injector 46 is ejected laterally therefrom so that the outflowing fluid intersects the absorber members 45 and the incident solar radiation arriving from the cylindrical window 41. The flowing working fluid engulfs the various solar absorber members 45 and sweeps the front face of base body 44. Hot working fluid discharged from the periphery of volumetric solar absorber 43 is diverted by baffles 52 into the rear chamber 51 from where it is delivered via the tubular opening 49.

Figure 6:
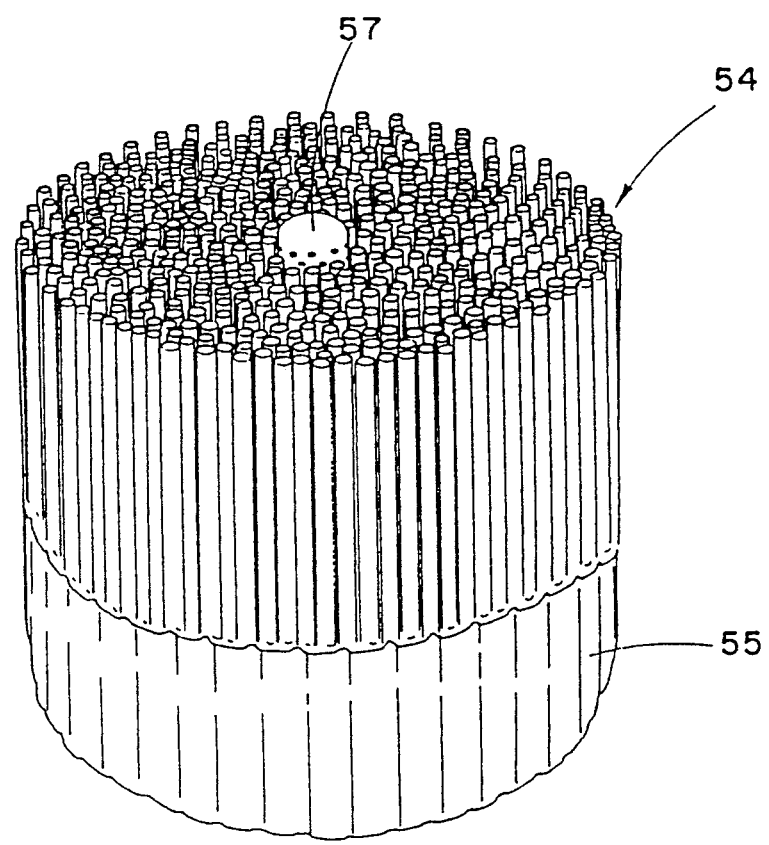
FIG. 6 is a perspective view of a volumetric solar absorber according to the invention.
Figure 7:
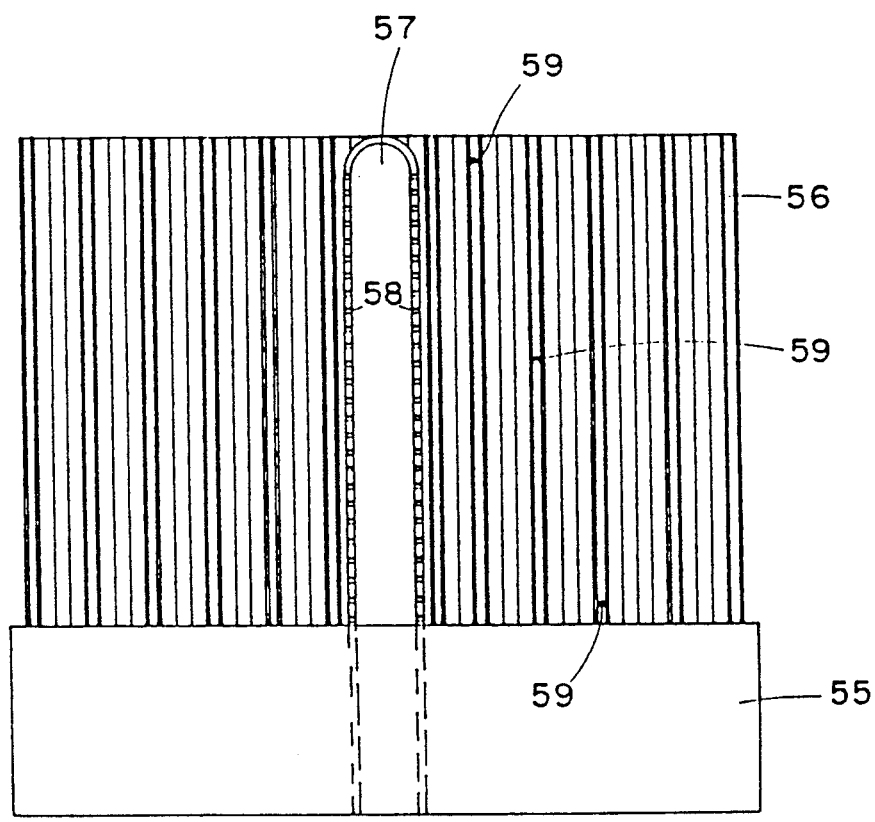
FIG. 7 is a section across the absorber of FIG. 6.
Figure 8:
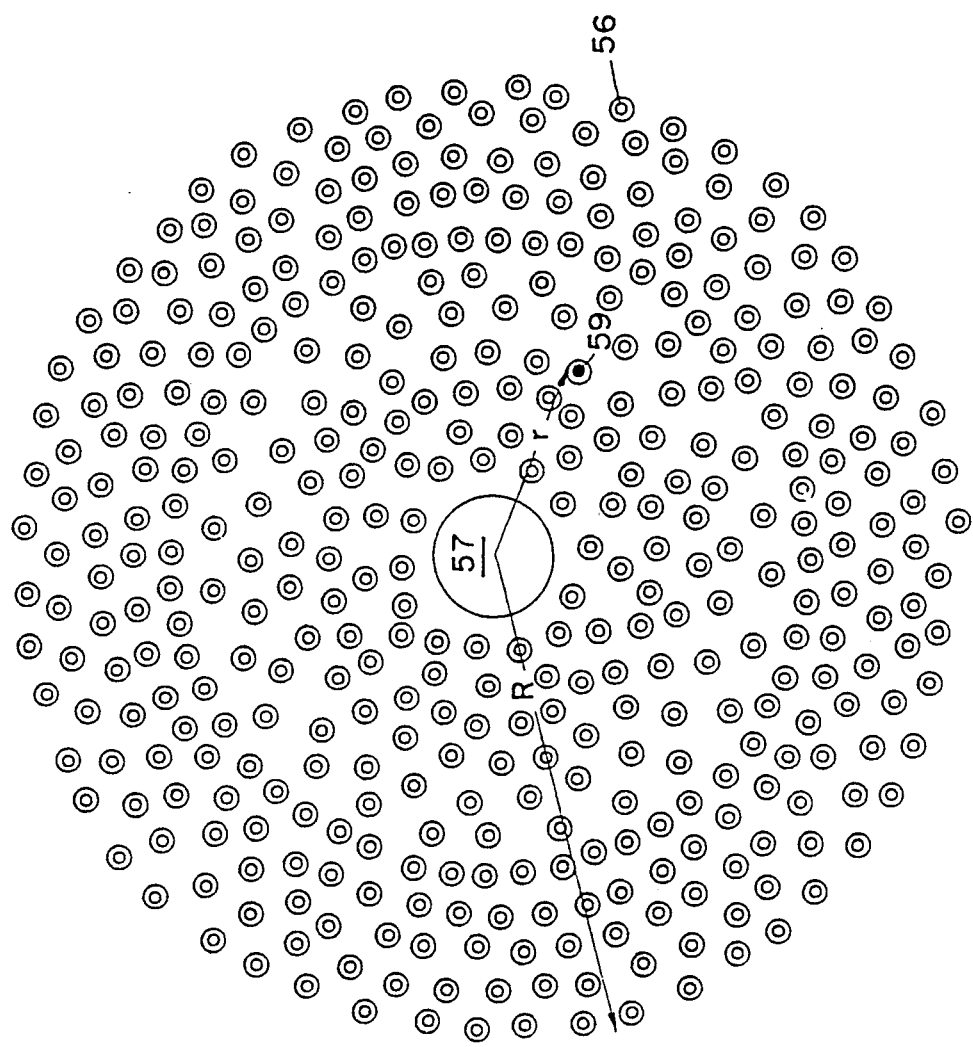
FIG. 8 is a plan view of the absorber of FIG. 6.

FIGS. 6, 7 and 8 illustrate one embodiment of a volumetric solar absorber according to the invention. The volumetric solar absorber 54 here shown comprises a cylindrical base body 55 having a radius R and holding a plurality of tubular solar absorber members 56 (some of which are shown sectioned while others are not) projecting vertically from one face of the base body. At its centre the solar absorber 54 comprises an injector 57 having a sealed end portion and comprising a plurality of lateral nozzles 58. A number of thermocouples 59 for temperature measurements (only a few of which are shown in FIGS. 7 and 8) are mounted inside some of the absorber members 56. A particular absorber member is fitted with only one single thermocouple 59 which may be near the top, in the middle or near the bottom. When the volumetric solar absorber is mounted within a central solar receiver, the wiring of the thermocouples is led outside the receiver via suitable sheathing such as, for example, sheath 35 in FIG. 4.

Figure 9:
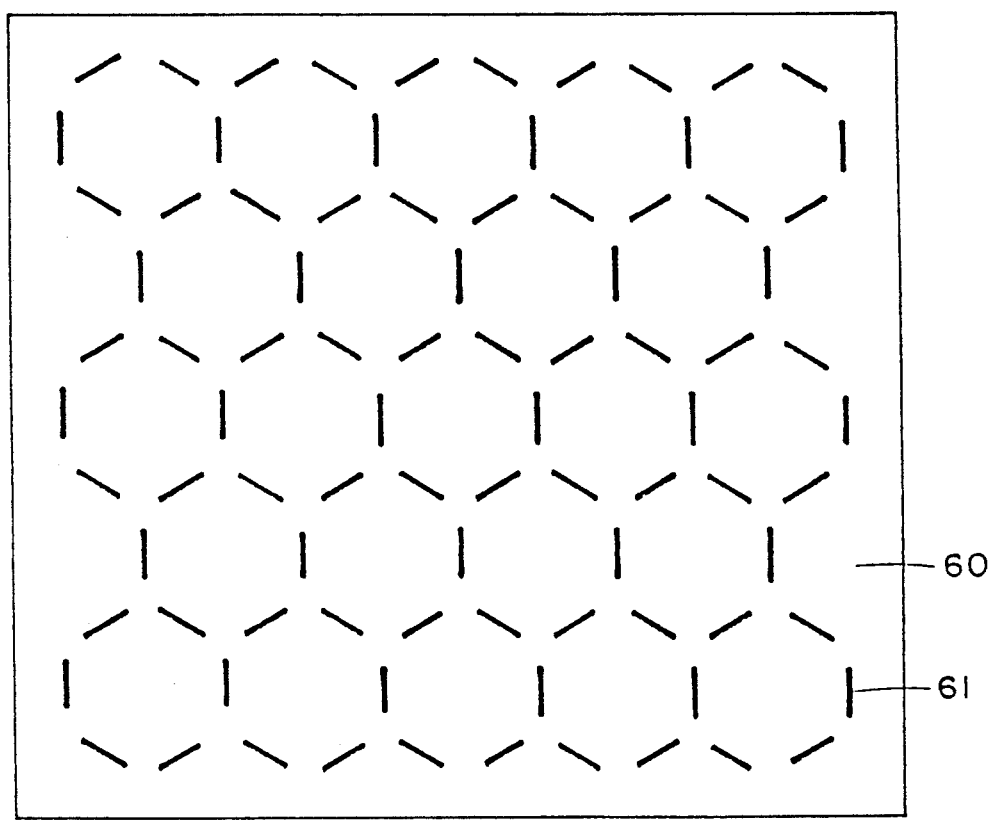
FIG. 9 is a plan view of another embodiment of a volumetric solar absorber according to the invention.

FIG. 9 is a plan view of another embodiment of a volumetric solar absorber according to the invention in which a rectangular base body 60 carries a plurality of flat, panel-like solar absorber elements 61 arranged with suitable spacing in a honeycomb-like fashion, the injector(s) not being shown here, they can be located at the centre, or near one side of the base plate.

Figure 10B:
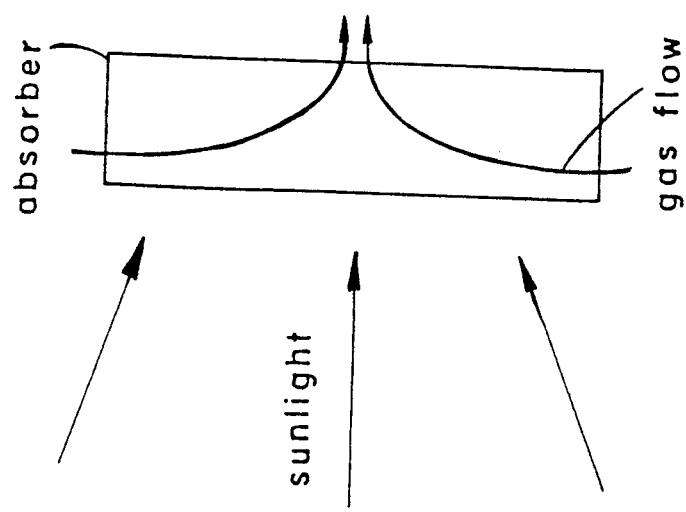
FIG. 10 shows schematically two flow regimens of working fluid in volumetric solar absorbers according to the invention.
Figure 10A:
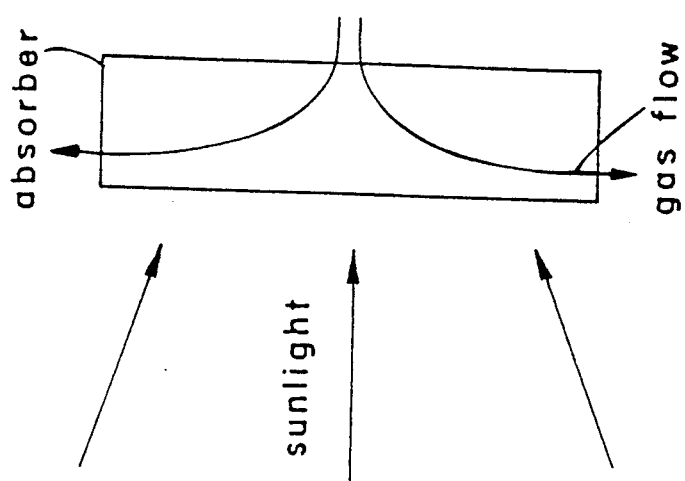

FIG. 10 shows the working fluid flow regimen in volumetric solar absorbers according to the invention. According to FIG. 10(a) a centrally injected working fluid expands radially so as to intersect the individual absorber members which corresponds to the embodiments of the invention shown in FIGS. 3 to 9. As an alternative, the injectors may be placed in the periphery and hot air be withdrawn through a central withdrawal tube and such a flow regimen is shown in FIG. 10(b), the injected working fluid again intersecting the absorber members and the incident solar radiation. The key to flow control and matching with solar flux distribution is the flow direction across the absorber, not through it as in prior arts (FIG. 2).

Figure 11:
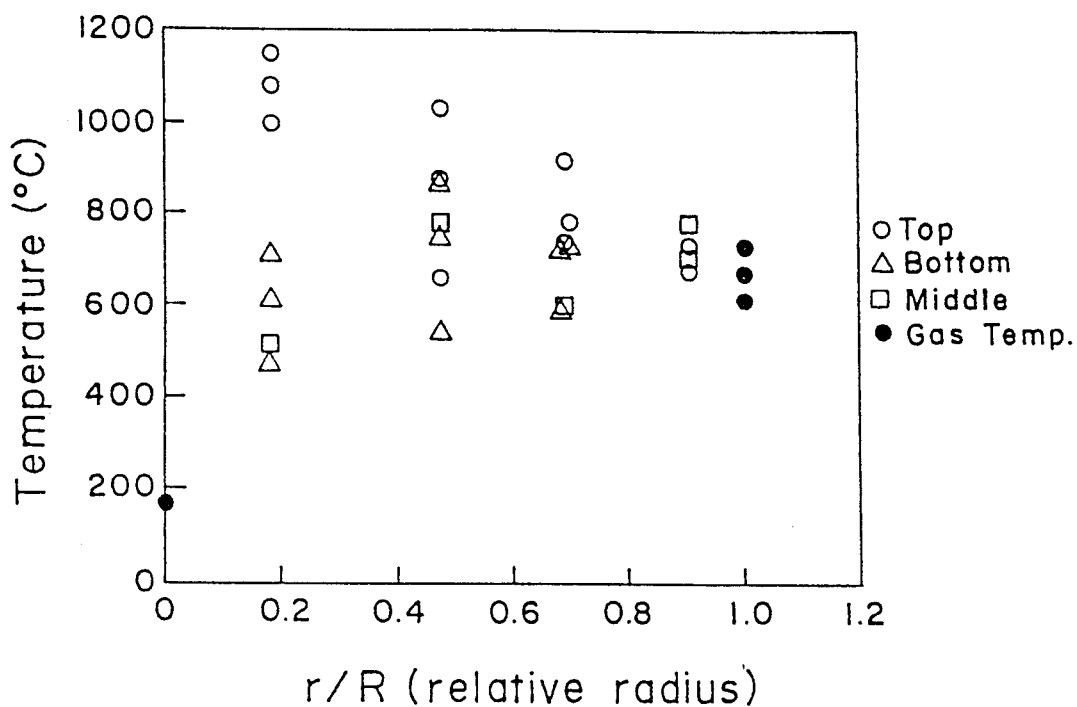
FIGS. 11 and 12 show results of temperature distribution measurements over a volumetric solar absorber according to FIGS. 6-8 mounted in a furnace according to FIG. 3.
Figure 12:
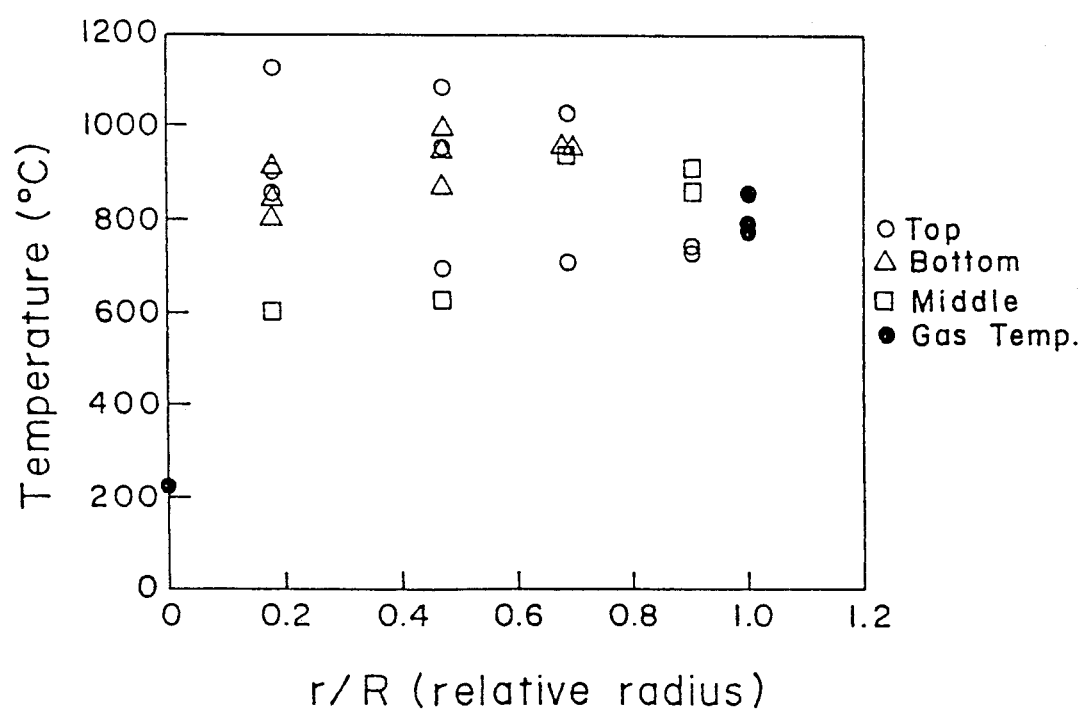

Referring now to FIGS. 11 and 12, there are shown results of temperature measurements at three different levels along the tubular members, as a function of the distance from the absorber's centre, performed in a central solar receiver of the kind shown in FIGS. 3 and 4 fitted with a volumetric solar absorber of the kind shown in FIGS. 6 to 8. The distance from the centre is expressed in terms of relative radii, i.e. r/R where r is the distance of the particular thermocouple from the centre and R is the radius of the circular volumetric solar absorber.

In the measurements represented in FIG. 11 the upper end of the injector was below the top of the absorber members while in the measurements represented in FIG. 12 the injector and solar absorber members were co-extensive. It is seen that in both cases the vertical and horizontal heat distribution is fairly uniform, the results in FIG. 12 being slightly better than those in FIG. 11.

I claim:

1. In a central solar receiver having a housing with a window portion for the admission of incident concentrated solar radiation, a volumetric solar absorber within the housing made of material capable of withstanding high temperature, working fluid injector means and means for the withdrawal of hot working fluid, the improvement which comprises said volumetric solar absorber having a base body holding an array of absorber members each having two ends, one end fixed to said base body and the other end being a free end spaced away from said base body, said absorber members being spaced from each other and projecting from one face of said base body, said free ends being turned towards said window portion of said housing and said working fluid injector means having means to inject said working fluid into the volumetric solar absorber in flow directions which interest said absorber members and the incident solar radiation.

2. A central solar receiver according to claim 1, wherein the working fluid injector means are associated with the volumetric solar absorber.

3. A central solar receiver according to claim 2, comprising a single working fluid injector located at the center of the volumetric solar absorber.

4. A central solar receiver according to claim 2, comprising a plurality of working fluid injectors distributed throughout the volumetric solar absorber.

5. A central solar receiver according to claim 2, comprising a plurality of working fluid injectors evenly distributed around the periphery of the volumetric solar absorber.

6. A central solar receiver according to claim 1, wherein each working fluid injector is a tubular body with a sealed end portion and a perforated section or a plurality of lateral ports or nozzles.

7. A central solar receiver according to claim 1, wherein the face of the base body from which the absorber members project is flat.

8. A central solar receiver according to claim 1, wherein the face of the base body from which the absorber members project is concave.

9. A central solar receiver according to claim 1, wherein said absorber members are hollow.

10. A central solar receiver according to claim 1, wherein said absorber members are flat panels.

11. A central solar heater according to claim 1, wherein the absorber members of the central solar absorber are made of or coated with a material capable of catalyzing a heat induced chemical reaction between components of the working fluid.

12. A volumetric solar absorber according to claim 1, fitted with tubular working fluid injector means projecting co-directionally with said absorber members, having a sealed end portion and a perforated section or a plurality of lateral ports or nozzles.

13. A volumetric solar absorber according to claim 12, comprising one single, centrally located working fluid injector.

14. A volumetric solar absorber according to claim 12, comprising a plurality of working fluid injectors distributed between the absorber members.

15. A volumetric solar absorber according to claim 12, comprising a plurality of working fluid injectors distributed around the periphery.

16. A volumetric solar absorber according to claim 1, wherein the face of the base body from which the absorber members project is flat.

17. A volumetric solar absorber according to claim 1, wherein the face of the base body from which the absorber members project is concave.

18. A volumetric solar absorber according to claim 1, wherein said absorber members are hollow.

19. A volumetric solar absorber according to claim 1, wherein said absorber members are flat panels.

20. A volumetric solar absorber according to claim 1, fitted with thermocouple elements for temperature measurements.

* * * * *